(12) United States Patent
Estes

(10) Patent No.: US 11,827,065 B2
(45) Date of Patent: Nov. 28, 2023

(54) LUBRICATED TRAILER BALL AND RECEIVER ASSEMBLY

(71) Applicant: Lloyd Frank Estes, Springtown, TX (US)

(72) Inventor: Lloyd Frank Estes, Springtown, TX (US)

(*) Notice: Subject to any disclaimer, the term of this patent is extended or adjusted under 35 U.S.C. 154(b) by 0 days.

(21) Appl. No.: 18/112,044

(22) Filed: Feb. 21, 2023

(65) Prior Publication Data

US 2023/0264531 A1    Aug. 24, 2023

Related U.S. Application Data

(60) Provisional application No. 63/313,154, filed on Feb. 23, 2022.

(51) Int. Cl.
*B60D 1/58* (2006.01)
*B60D 1/50* (2006.01)
*B60D 1/06* (2006.01)

(52) U.S. Cl.
CPC .............. *B60D 1/586* (2013.01); *B60D 1/06* (2013.01); *B60D 1/50* (2013.01)

(58) Field of Classification Search
CPC ............. B60D 1/586; B60D 1/06; B60D 1/50
See application file for complete search history.

(56) References Cited

U.S. PATENT DOCUMENTS 3,184,254 A * 5/1965 Seeley ................... B60D 1/065
                                                    280/513
3,436,101 A * 4/1969 Hanson .................. B60D 1/065
                                                    285/94
3,788,673 A 1/1974 Gloege
3,837,675 A * 9/1974 Barnes ................... B60D 1/488
                                                    280/901
4,832,360 A * 5/1989 Christian ................. B60D 1/06
                                                    280/511

(Continued)

FOREIGN PATENT DOCUMENTS

CN      105459744         4/2016
EP       1468848 A1 * 10/2004  ............... B60D 1/00

(Continued)

OTHER PUBLICATIONS

International Search Report and Written Opinion dated May 23, 2023 in PCT application No. PCT/US2023/013518.

*Primary Examiner* — Kevin Hurley
(74) *Attorney, Agent, or Firm* — SNELL & WILMER L.L.P.

(57) ABSTRACT

A system is disclosed herein including a tow vehicle including and a trailer. The tow vehicle includes a bed having a first surface and an opposing second surface and a receiver assembly coupled to the bed, the receiver assembly extending through the first surface and the second surface. The receiver assembly includes a hollow cylinder having a first end and a second end, the first end of the hollow cylinder coupled to the bed of the tow vehicle and a ball receiver having a semi-spherical shape, the ball receiver coupled to the second end of the hollow cylinder. The trailer includes a deck, a neck coupled to the deck and a trailer coupler coupled to the neck. The trailer coupler includes a trailer ball configured to engage the receiver assembly of the tow vehicle.

18 Claims, 8 Drawing Sheets

(56) References Cited

U.S. PATENT DOCUMENTS

| | | | | |
|---|---|---|---|---|
| 5,040,817 A | * | 8/1991 | Dunn | F16C 11/0609 |
| | | | | 280/504 |
| 6,382,865 B1 | * | 5/2002 | Paxman | F16C 11/0609 |
| | | | | 403/139 |
| 7,125,031 B1 | | 10/2006 | Schoonover | |
| 2019/0085893 A1 | * | 3/2019 | Kraatz | F16C 11/0604 |

FOREIGN PATENT DOCUMENTS

| | | | | |
|---|---|---|---|---|
| EP | 2682290 A1 | * | 1/2014 | B60D 1/06 |
| WO | WO-2020223759 A1 | * | 11/2020 | B60D 1/065 |

* cited by examiner

LUBRICATED TRAILER BALL AND RECEIVER ASSEMBLY

CROSS-REFERENCE TO RELATED APPLICATIONS

This application claims priority to, and the benefit of, U.S. Provisional Patent Application No. 63/313,154, filed Feb. 23, 2022, and titled "Lubricated Trailer Ball and Receiver Assembly," which is incorporated by reference herein in its entirety for all purposes.

FIELD

The present disclosure generally relates trailer hitches, and more specifically, to trailer hitch ball and receiver assemblies.

BACKGROUND

Generally, tow vehicles, including pickup truck vehicles and semi tractors, and trailers can be identified as class 2 through 8 type vehicles, whereby semi tractors can be identified as class 8. These different class vehicles share the same similarity of being capable of pulling various types of trailers. Pulling such trailers requires a device known as a hitch. Some common examples of hitches include bumper hitch, receiver and ball platform, gooseneck hitch, and fifth wheel hitch. The conventional hitch assembly of these class vehicles and/or the trailers they tow has seen only minor design revisions over many years, even despite vehicle engine horse power, torque, and Gross Vehicle Weight Rating (GVWR) having increased through the years.

Fifth wheel hitches use jaws that latch onto a protruded "stem" of a semi-trailer. The "stem" is embedded within a thick plate of sheet steel that is attached under the deck, or floor, of the semi-trailer. The stem, also referred to as a King Pin, is a machined round rod having a machined center groove that the 5th wheel jaws to engages. Over time, wear and usage causes deterioration in the tolerances of the jaws. Loose jaws may cause a noticeable shock load to the tow vehicle which can be a safety concern. The fifth wheel jaws are typically tighten by tightening a threaded rod, that if tightened incorrectly, may allow the stem, or King Pin, to disengage from the jaws of the fifth wheel hitch.

Typically, lower class tow vehicles (e.g., class 2) can tow lesser rated trailers with either a bumper hitch, a receiver and ball hitch, a goose-neck hitch, or miniature fifth wheel hitch, such as used in travel trailers. Typically, industry standards can refer to the goose-neck design as a ball and coupler with the ball installed on the tow vehicle and the coupler installed on the trailer. The conventional ball diameters are generally between 1⅞ inches and 3 inches, with 2 5/16 inches (about 5.87 centimeters) being common, and the coupler installed on the trailer has an orifice sized to engage the ball. Typically, the coupler will be equipped with a latching mechanism intended to retain the coupler from separating from the ball installed on the tow vehicle. Further, the trailer frame coupler is typically equipped with safety chains or cables, as required by the US Department of Transportation (US-DOT).

The conventional tow ball (e.g., 2 5/16 inches (5.87 centimeters)) and coupler have a "dry" fit connection with respect to each other. As a result, each movement of the tow vehicle or trailer is subject to a coefficient of friction creating abrasion on the ball and coupler via the dry frictional forces and surface tensions between the ball and coupler. Specifically, it has been observed that through time this friction and abrasion reduces the ball diameter and enlarges the receiving coupler orifice, thereby increasing the risk of the two components disconnecting, which could have serious and/or fatal consequences on the road.

For trailer frames with embedded couplers, the coupler extends adjustable dimensions below the trailer neck frame. That extension then becomes a lever arm, resulting in a trailer twisting moment under various conditions. An increasing percentage of trailers are constructed with Aluminum. Aluminum is especially known to work harden and fatigue from bending, or rigidity movement, resulting in failure. There again, the ball and coupler present problems with material fatigue and/or failure. As the coupler rotates, friction restricts rotation, the coupler cogs on the ball, releases from the ball, and creates a shock load to both the tow vehicle and the trailer.

SUMMARY

Disclosed herein is a trailer ball and receiver assembly, including a trailer ball assembly coupled to a trailer, the trailer ball assembly including a trailer ball and a ball receiver assembly coupled to a tow vehicle, the ball receiver assembly including a semi-spherical socket configured to receive the trailer ball assembly.

In various embodiments, the receiver assembly further includes a lubricant channel formed in a bottom of the semi-spherical socket and extending through a bottom of the ball receiver assembly and a plug configured to be inserted into and removed from the lubricant channel, the plug further configured to prevent liquid from passing through the lubricant channel when inserted into the lubricant channel.

In various embodiments, the receiver assembly further includes a cylinder having a first end and opposing second and a hole formed from the first end to the second end, wherein the second end of the cylinder is coupled to the ball receiver assembly so that the semi-spherical socket opens toward the hole.

In various embodiments, the semi-spherical socket has a diameter of about 5.5 inches to about 7.5 inches. In various embodiments, the trailer ball has a diameter of about 5 inches to about 7 inches. In various embodiments, the trailer ball and receiver assembly further includes a ball mount configured to receive the trailer ball and secure the trailer ball in place and a trailer coupler adapter having a first end and a second end, the first end coupled to the ball mount and the second end coupled to the trailer. In various embodiments, the trailer ball and receiver assembly further includes a lubricant disposed within the semi-spherical socket and between the semi-spherical socket and the trailer ball.

Also disclosed herein is a system including a tow vehicle including and a trailer. The tow vehicle includes a bed having a first surface and an opposing second surface and a receiver assembly coupled to the bed, the receiver assembly extending through the first surface and the second surface. The receiver assembly includes a hollow cylinder having a first end and a second end, the first end of the hollow cylinder coupled to the bed of the tow vehicle and a ball receiver having a semi-spherical shape, the ball receiver coupled to the second end of the hollow cylinder. The trailer includes a deck, a neck coupled to the deck, and a trailer coupler coupled to the neck. The trailer coupler includes a trailer ball configured to engage the receiver assembly of the tow vehicle.

In various embodiments, the system further includes a lubricant disposed in the receiver assembly, the lubricant disposed between the trailer ball and the ball receiver. In various embodiments, the receiver assembly further includes a channel formed in and through a bottom of the ball receiver, the channel configured to drain the lubricant from the ball receiver and a removable plug configured to be inserted into the channel, the removable plug preventing the lubricant from draining from the ball receiver.

In various embodiments, the trailer coupler further includes a trailer coupler adapter, a ball mount configured to receive the trailer ball, and a damper disposed between the ball mount and the trailer coupler adapter. In various embodiments, the system further includes a plurality of holes formed along a length of the trailer coupler adapter, the plurality of holes configured to secure the trailer coupler adapter to the neck of the trailer.

In various embodiments, the trailer ball has a first diameter, the first diameter being about 5 inches to about 7 inches. In various embodiments, the semi-spherical shape of the ball receiver has a second diameter, the second diameter being about 1/16 inch larger than the first diameter.

Also disclosed herein is a towing system including a tow vehicle having a bed, a trailer, and a lubricated ball and receiver assembly coupling the trailer to the tow vehicle. The lubricated ball and receiver assembly includes a receiver assembly having a first end and a second end, the first end coupled to the bed of the tow vehicle, the second end extending downward from the bed of the tow vehicle, the second end of the receiver assembly ending in a semi-spherical ball receiver, a drain formed in the semi-spherical ball receiver and through the second end of the receiver assembly, a lubricant disposed in the semi-spherical ball receiver, a trailer ball sized to pass through the receiver assembly and into the semi-spherical ball receiver, and a trailer coupler including a first vertical member having a first end and a second end, the first end of the first vertical member coupled to the trailer, and the second end of the first vertical member coupled to the trailer ball.

In various embodiments, the towing system further includes a plug configured to be inserted into the drain, the plug preventing the lubricant from exiting the receiver assembly when inserted. In various embodiments, the trailer ball has a first diameter and the semi-spherical ball receiver has a second diameter, the second diameter being larger than the first diameter. In various embodiments, the first diameter is about 5 inches to about 7 inches and the second diameter is about 1/16 inches to about 3/16 inches larger than the first diameter.

In various embodiments, the trailer coupler further includes a second vertical member having a first end and a second end and a damper disposed between the first vertical member and the second vertical member. In various embodiments, the receiver assembly extends about 3 inches to about 18 inches below the bed of the tow vehicle.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
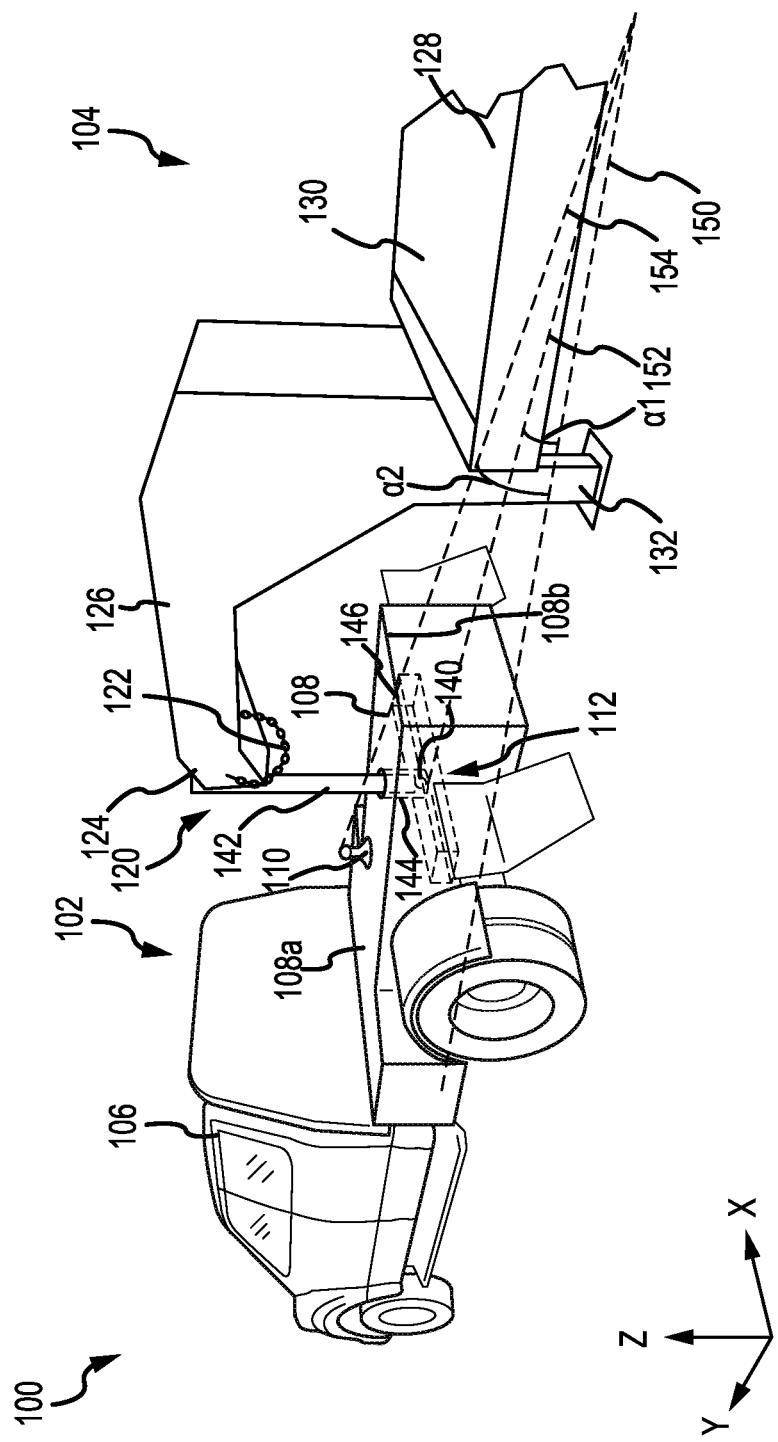
FIG. 1 illustrates a truck and trailer having a trailer hitch ball and receiver assembly, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a trailer ball and receiver assembly for use with tow vehicles and trailers. The trailer ball and receiver may replace conventional hitch balls and couplers currently in use. In various embodiments, a receiver assembly is coupled to a tow vehicle, and more specifically, below a bed of the tow vehicle. In various embodiments, a cross member is coupled to the tow vehicle, below the bed of the tow vehicle, and extending from one side of the tow vehicle to the other. The cross member adds rigidity to the frame of the tow vehicle as well as support for the receiver assembly.

In various embodiments, the receiver assembly includes a semi-circular receiver and a cylindrical component. In various embodiments, a top portion of the cylindrical component may be coupled the bed of the tow vehicle with the cylinder extending downward from the bed of the tow vehicle. In various embodiments, the semi-circular receiver may be coupled a bottom portion of the cylindrical component. In various embodiments, the receiver assembly, and more specifically, the semi-circular receiver is configured to receive and secure a trailer ball, or simply, ball.

In various embodiments, the trailer ball, or ball, may have a diameter of about 4 inches (about 10.2 centimeters) to about 8 inches (about 20.3 centimeters). In various embodiments, the ball may be coupled to a neck of a trailer. In various embodiments, the trailer may be a gooseneck trailer or a fifth wheel trailer. In various embodiments, an adapter, or ball mount, may be used to couple the ball to the neck of the trailer. In various embodiments, the ball and ball mount may be coupled to the tow vehicle by lowering the ball into the receiver assembly, and more specifically, into the cylindrical component to engage the semi-circular receiver.

In various embodiments, the trailer ball and receiver assembly may be lubricated. The lubricant may reduce the friction between the ball and the semi-circular receiver. This may result is less cogging, or catching, between the ball and the receiver, reducing force transfer from the tow vehicle to the trailer. This decreases stresses and wear on the trailer and on the tow vehicle, improving the functional life of both the trailer and the tow vehicle.

The trailer ball and receiver assembly disclosed herein may be retrofitted to existing trailers and tow vehicles, respectively. As disclosed herein, the trailer ball and receiver assembly does not allow the trailer ball to disengage from the receiver assembly, thereby removing common safety concerns with other types of hitches (e.g., fifth wheels). Additionally, the trailer ball and receiver assembly may improve the ride of the tow vehicle, the handling of the tow vehicle, and wear on both the tow vehicle and the trailer. In various embodiments, the tow vehicle may see improved fuel efficiency using the trailer ball and receiver assembly disclosed herein as compared with current hitch ball and coupler designs. Some of the improved fuel efficiency may be achieved through a reduction in weight as the ball and receiver assembly disclosed herein may be lighter than conventional fifth wheel hitches. In various embodiments, the trailer may experience less twisting and/or torquing when using the trailer ball and receiver assembly as compared to as compared to existing hitch ball and coupler assemblies, resulting in an increased useable life of the trailer. In various embodiments, the reduced twisting, or torquing, of the trailer may result in decreased work hardening of the trailer structure. Additionally, the trailer ball and receiver assembly disclosed herein eliminates the use of expensive pads that are currently used to reduce abrasion and wear in fifth wheel hitches.

Referring now to FIG. 1, a system 100 including a tow vehicle 102 and a trailer 104 are illustrated, in accordance with various embodiments. In various embodiments, tow vehicle 102 may be a pickup truck, a semi-tractor, a tractor, a cab over truck, or a terminal truck (e.g., yard truck, yard goat, etc.), among other types of vehicles used for towing. Tow vehicle 102 includes a cab 106 and a bed 108 located behind cab 106 (e.g., in the negative y-direction). Cab 106 may accommodate a driver and one or more passengers. Bed 108 has a top surface 108a and bottom surface 108b. Bed 108 may be used for hauling cargo (e.g., on top surface 108a) and/or coupling trailer 104 to tow vehicle 102. System 100 further includes a conventional trailer ball 110 coupled to bed 108 (e.g., on top surface 108a) and a trailer ball and receiver system 112.

Trailer ball and receiver system 112 includes a receiver assembly 144 and a trailer ball 140. In various embodiments, receiver assembly 144 may be coupled to bed 108 (e.g., through top surface 108a and bottom surface 108b). In various embodiments, trailer ball 110 may be a conventional 2 5/16 inches (5.87 centimeters) trailer ball coupled to top surface 108a of bed 108. That is, trailer ball 110 may extend above bed 108 (e.g., in the positive z-direction and over top surface 108a). In various embodiments, receiver assembly 144 may be position behind trailer ball (e.g., in the negative y-direction). Receiver assembly 144 may extend below bed 108 (e.g., in the negative z-direction or toward a road surface). In various embodiments, trailer ball and receiver system 112 may further include a cross member 146 that extends from one side of tow vehicle 102 to the other side (e.g., along the x-axis). Receiver assembly 144 may extend into and/or through cross member 146. Cross member 146 may provide support for receiver assembly 144 and/or rigidity to tow vehicle 102.

In various embodiments, receiver assembly 144 may interfere with an axle housing of tow vehicle 102. In such embodiments, the axle housing may be modified to accommodate installation of receiver assembly 144. Clearance between receiver housing 144 and the axle housing may be reduced, and in various embodiments eliminated, by modifying the axle housing to accommodate receiver assembly 144. In various embodiments, receiver assembly 144 may rest on the axle housing. In various embodiments, receiver assembly 144 may be attached to axle housing. In various embodiments, receiver assembly 144 may be cast into the axle housing at the time of production. By so doing, the added weight of receiver housing 144, and more generally trailer ball and receiver system 112, is supported by the axle housing and may add little to no load compression to the suspension, frame rails, springs, and other components of tow vehicle 102.

In various embodiments, tow vehicle 102 may include only receiver assembly 144. In various embodiments, tow vehicle 102 may omit the conventional trailer ball 110. It should be appreciated that while a conventional trailer ball 110 (e.g., a gooseneck hitch) is illustrated in FIG. 1, tow vehicle 102 may include a bumper hitch, a fifth wheel hitch, and/or a conventional receiver and ball style hitch. It should further be appreciated that receiver assembly 144 may be installed in, or on, tow vehicle 102 either alone or in combination with any other hitch such as a bumper hitch, a gooseneck hitch (e.g., trailer ball 110), a fifth wheel hitch, and/or a conventional receiver and ball style hitch, among others. Furthermore, in various embodiments, receiver assembly 144 may be installed in, or on, a dolly to allow towing a second trailer. Therefore, it should be understood that tow vehicle 102 illustrated in FIG. 1 is not meant to being limiting but for aiding in the discussion below.

As illustrated, trailer 104 is connected to tow vehicle 102 using trailer ball and receiver system 112. In various embodiments, trailer 104 may be a gooseneck trailer, a fifth wheel trailer, or a bumper pull trailer. Trailer 104 includes a coupler hitch 120, one or more safety chains 122, a nose plate 124, a neck 126, a frame 128, a deck 130, and one or more drop log jacks 132. Deck 130 is coupled to frame 128 providing a surface on which to secure materials for transport. In various embodiments, trailer 104 may be enclosed such as, for example, a box trailer, a refrigerator trailer, a livestock or animal trailer, or a cargo trailer, among others.

Neck 126 is coupled to a forward portion (e.g., toward the positive y-direction) of frame 128 and is configured to connect trailer 104 to tow vehicle 102 while allowing deck 130 to be level at a desired height (spacing along the z-axis relative to a road surface). In various embodiments, the one or more drop log jacks 132 may be coupled to the forward portion of frame 128 below (e.g., disposed farther in a negative-z direction or nearer the road surface) neck 126. Drop log jacks 132 provide support for trailer 104 when trailer 104 is not coupled to tow vehicle 102. In various embodiments, different aspects of trailer 104, including the aspects discussed herein, may be telescoping or rotating to provide more or less height as needed. Nose plate 124 is coupled to a forward portion of neck 126 and, when being towed, is disposed over bed 108 of tow vehicle 102. Coupler hitch 120 and safety chains 122 are coupled to neck 126, below (e.g., disposed farther in a negative-z direction or nearer the road surface) nose plate 124.

Coupler hitch 120 includes a trailer ball 140 coupled to neck 126 by a vertical support 142. Receiver assembly 144 is further configured a vertical support 143 coupled to trailer ball 140. That is, in contrast with conventional towing configurations in which trailer ball 110 is coupled to tow vehicle 102 and a coupler is connected to trailer 104 to engage trailer ball 110, system 100 is designed so that trailer ball 140 is coupled to trailer 104 (e.g., coupler hitch 120) and receiver assembly 144 is coupled to tow vehicle 102. Additionally, trailer ball 140 may be larger than conventional trailer balls resulting in an increased towing capacity, as will be described in further detail below. This configuration provides an improved towing experience that will become apparent to the reader as trailer ball and receiver system 112 is described in further detail below. It should be appreciated that tow vehicle 102 and trailer 104 as illustrated in FIG. 1 are not intended to be limiting as to the application of the trailer ball and receiver system 112 disclosed herein, but are used for discussion purposes only. As such, any suitable tow vehicle 102 may be used to tow any suitable trailer 104 using trailer ball and receiver system 112 disclosed herein.

As disclosed herein, trailer ball and receiver system 112 provides lateral (e.g., along the x-axis) and longitudinal (e.g., along the y-axis) support. The additional support provided by trailer ball and receiver system 112 over conventional hitches increases the safety of tow vehicle 102 and trailer 104 while in use. Furthermore, trailer ball and receiver system 112 lowers the center line of the pulling force of tow vehicle (i.e., below bed 108) towards the center line of the wheels of trailer 104 (e.g., line 150). Lowering the center line of the pulling force (e.g., line 152) allows tow vehicle 102 to pull the nose of trailer 104 (e.g., nose plate 124) more parallel to the road (e.g., the y-axis) as compared to a typical fifth wheel hitch (e.g., line 154) which applies an upward force (e.g., in the positive z-direction) to the nose of trailer 104. There is an angle α1 between line 152 and line 150 (e.g., force line of trailer ball and receiver system 112) and an angle α2 between line 154 and line 150 (e.g., force line of conventional gooseneck or fifth wheel hitch). As illustrated in FIG. 1, angle α1 is less than angle α2. By lowering the center line of the pulling force of tow vehicle 102, angle α1 is decreased to provide the more parallel, and in various embodiments, parallel pulling force of tow vehicle 102 on trailer 104. Utilizing these concepts of trigonometry, geometry, and physics (e.g., lowering the force lines) improves the performance and lifespan of tow vehicle 102 and trailer 104.

The force line being more parallel to the road, and in various embodiments parallel to the road, decreases rocking of tow vehicle 102 (e.g., raising and lowering of the front and back of tow vehicle 102) and trailer 104 (e.g., raising and lowering of the front and back of trailer 104) as tow vehicle 102 and trailer 104 move over terrain that is not flat. Furthermore, lowering the center line of the pulling force may reduce the wear on tow vehicle 102 and trailer 104 by decreasing the amount of up and down (e.g., along the z-axis) and lateral (e.g., along the x-axis) movement of both tow vehicle 102 and trailer 104. The up, down, and lateral movement of tow vehicle 102 may affect the steering, wheel alignment, and tire wear of tow vehicle 102 as the combined weight of tow vehicle 102 and trailer 104 shifts from forward and backward on tow vehicle 102. Therefore, lowering the centerline of the pulling force may reduce the amount and/or frequency of maintenance for tow vehicle 102 and/or trailer 104. Additionally, lowering the center line of the pulling force may also increase the fuel efficiency of tow vehicle 102.

Figure 2:
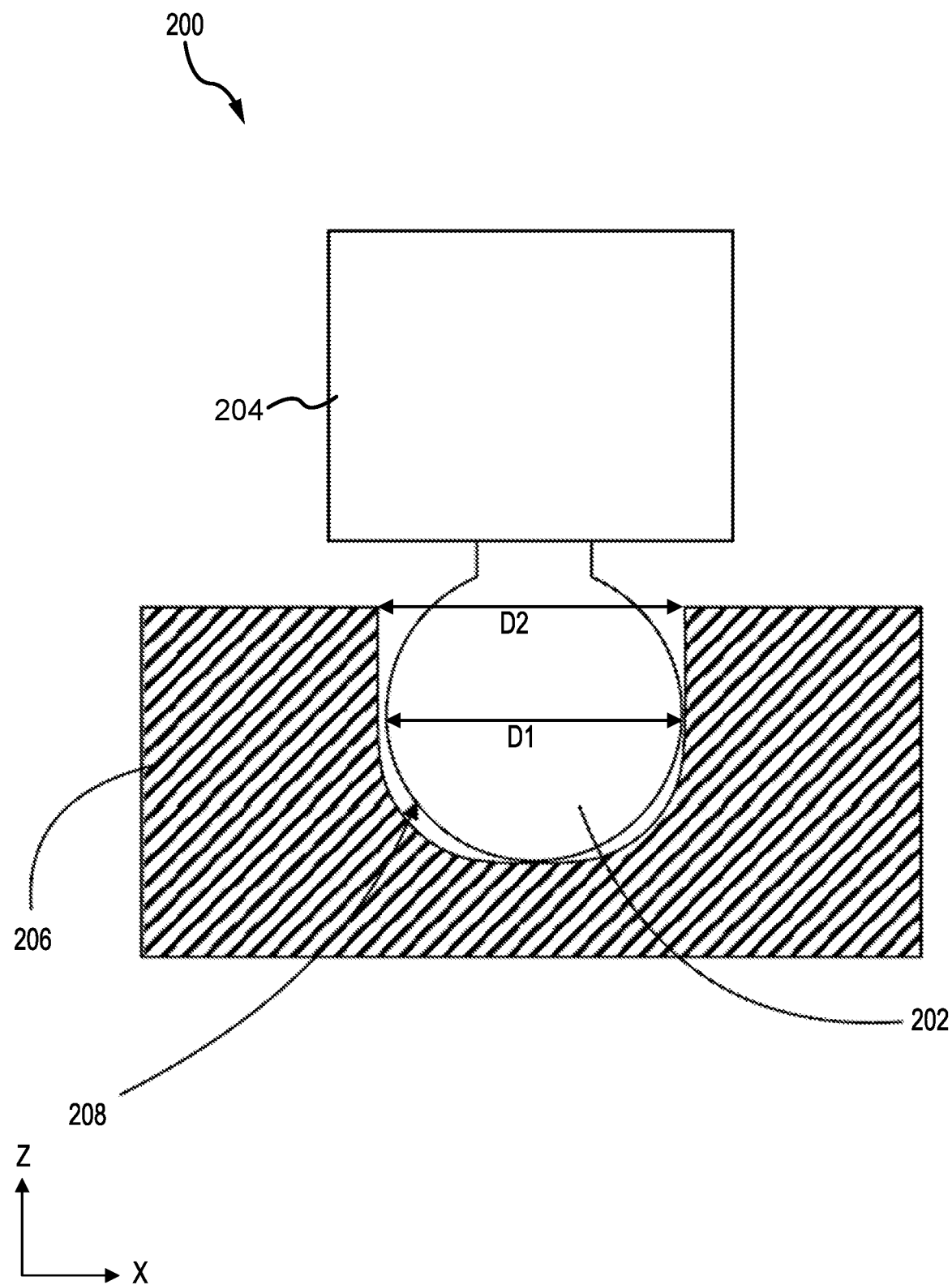
FIG. 2 illustrates a cross-sectional side view of a trailer hitch ball and receiver assembly, in accordance with various embodiments.

Referring now to FIG. 2, a trailer ball and receiver assembly 200 is illustrated, in accordance with various embodiments. Trailer ball and receiver assembly 200 may be an example of trailer ball and receiver system 112, described above with respect to FIG. 1. Trailer ball and receiver assembly 200 includes a trailer ball 202, a trailer coupler hitch 204, and a receiver assembly 206. Trailer ball 202 is spherical in shape. Receiver assembly 206 includes a socket 208 having a semi-spherical shape that is configured to receive trailer ball 202. In the depicted embodiment, trailer ball and receiver assembly 200 does not use any type of lubrication between trailer ball 202 and receiver assembly 206. This may be referred to as a dry socket or a dry fit. During use, trailer ball 202 abuts against socket 208 of receiver assembly 206 creating heat, wear, tear, and/or abrasion on the trailer ball and receiver assembly 200 (e.g., trailer ball 202 and receiver assembly 206). This may result in a reduction in diameter, size, and/or various surface deformations of trailer ball 202 over time.

The size of trailer ball 202 and socket 208 of receiver assembly 206 may be increased to mitigate the effects of a dry socket. In various embodiments, trailer ball 202 has a diameter D1 that is about 2 5/16 inches (about 5.87 centimeters) to about 8 inches (about 20.3 centimeters), and more specifically, about 4 inches (about 10.2 centimeters) to about 7 inches (about 17.8 centimeters), and even more specifically, about 6 inches (about 15.2 centimeters). Socket 208 of receiver assembly 206 has a diameter D2 that is about 1/16 inch (about 0.159 centimeter) to about 5/16 inches (about 0.794 centimeter) larger than diameter D1, and more specifically, about 3/16 inches (about 0.476 centimeter) larger than diameter D1. This configuration, in various embodiments, may reduce stress and/or strain on trailer ball and receiver assembly 200 by increasing the surface area over which the weight of a trailer (e.g., trailer 104, FIG. 1) is distributed as compared to a conventional 2 5/16 inches (5.87 centimeters) trailer ball.

Figure 3:
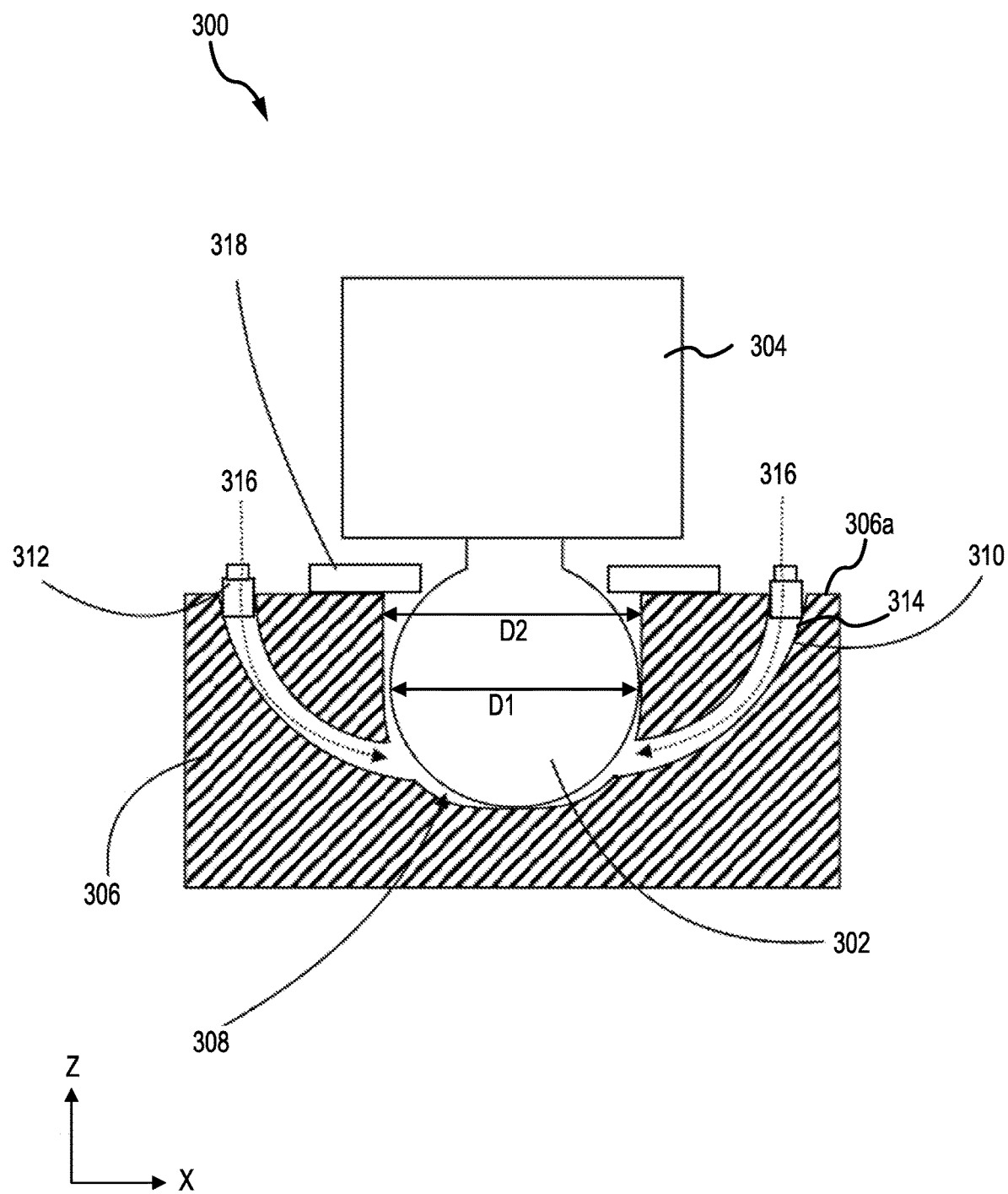
FIG. 3 illustrates a cross-sectional side view of aspects of a trailer hitch ball and receiver assembly, in accordance with various embodiments.

Referring now to FIG. 3, a trailer ball and receiver assembly 300 is illustrated, in accordance with various embodiments. Trailer ball and receiver assembly 300 may be an example of trailer ball and receiver system 112 described above with respect to FIG. 1. Trailer ball and receiver assembly 300 includes similar components as those described above for trailer ball and receiver assembly 200 with respect to FIG. 2, including a trailer ball 302, a trailer coupler 304, a receiver assembly 306, and a socket 308 of receiver assembly 306. Descriptions of each component may not be repeated below. Trailer ball and receiver assembly 300 further includes one or more lubrication channels 310 and one or more grease fittings 312, also referred to as grease Zerks.

The one or more lubrication channels 310 extend from one or more inlets 314 at a top surface 306a of receiver assembly 306 into socket 308 of receiver assembly 306. That is, socket 308 of receiver assembly 306 is fluidly coupled with top surface 306a of receiver assembly 306 by the one or more lubrication channels 310. In various embodiments, the one or more lubrication channels 310 may be channels, tubes, or piping, among other structures, that allow a lubricant 316 to flow from outside of receiver assembly 306 into socket 308. In various embodiments, lubricant 316 may be any type of lubricant, such as grease, dry lubricants, wet lubricants, oil-based, water-based, plant-based, and silicone-based, among others. In various embodiments, receiver assembly 306 may include a single lubrication channel 310. In various embodiments, receiver assembly 306 may include more than two lubrication channels 310. In various embodiments, each lubrication channel 310 may exit into socket 308 at a point that higher or lower (e.g., in the z-direction) than depicted in FIG. 3.

In various embodiments, one or more of the lubrication channels 310 may further include a release valve at the outlet connected to socket 308. In various embodiments, grease fitting 312 may be located at the inlet of each lubrication channel 310. Grease fitting 312, also referred to as a grease Zerk, provides a port through which lubricant 316 may be introduced into lubrication channel 310. Additionally, grease fitting 312 may prevent back flow of lubricant from lubrication channel 310. In various embodiments, grease fitting 312 may be used to pressurize lubrication channel 310, such as for injecting lubricant into receiver assembly 306 under pressure. For instance, a tool conventionally known as a grease gun may be attached to the grease fitting 312 and may inject lubricant 316 into lubrication channel 310 and socket 308 of receiver assembly 306 under pressure. In various embodiments, receiver assembly 306 may use an open/close valve at inlet 314 of each lubrication channel 310 to introduce lubricant into socket 308 instead of grease fitting 312. In various embodiments, the open/close valve may be a one-way or a two-way valve.

Trailer ball and receiver assembly 300 may optionally include a locking collar 318 disposed on top surface 306a and above socket 308 (e.g., the positive z-direction) and around trailer ball 302. Locking collar 318 may be secured to top surface 306a of receiver assembly 306 to prevent trailer ball 302 from unintentionally exiting socket 308. In various embodiments, locking collar 318 may have an annular shape. In various embodiments, locking collar 318 may be coupled between trailer ball 302 and a trailer coupler hitch (e.g., coupler hitch 120, FIG. 1) such that it is a part of the trailer (e.g., trailer 104, FIG. 1).

Figure 4:
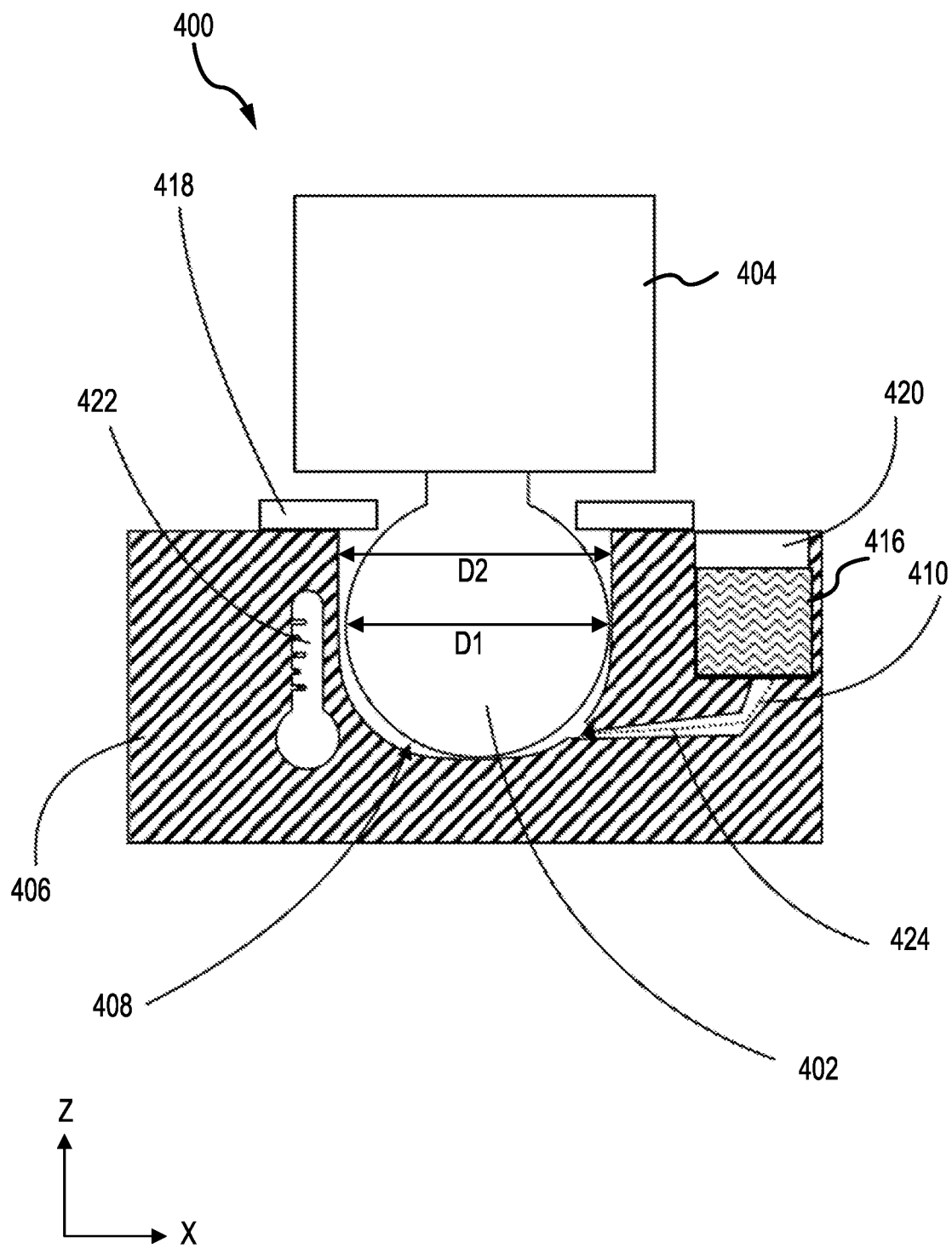
FIG. 4 illustrates a cross-sectional side view of aspects of a trailer hitch ball and receiver assembly, in accordance with various embodiments.

Referring now to FIG. 4, a trailer ball and receiver assembly 400 is illustrated, in accordance with various embodiments. Trailer ball and receiver assembly 400 may be an example of trailer ball and receiver system 112 described above with respect to FIG. 1. Trailer ball and receiver assembly 400 includes similar components as those described above with respect to trailer ball and receiver assembly 300 in FIG. 3, including a trailer ball 402, a trailer coupler 404, a receiver assembly 406, a socket 408, a lubrication channel 410, a lubricant 416, and an optional locking collar 418. Descriptions of each component may not be repeated below. Trailer ball and receiver assembly 400 further includes one or more lubricant reservoirs 420 and one or more sensors 422.

The one or more lubricant reservoirs 420 may hold any type of lubricant 416. In various embodiments, lubricant 416 may include grease, dry lubricants, wet lubricants, oil-based, water-based, plant-based, and silicone-based, among others. Each lubricant reservoir 420 may be connected to socket 408 by lubrication channel 410, as described above for lubrication channels 310 (FIG. 3). Each lubricant reservoir 420 may include a lid, a hatch, or a valve, among other components, to secure lubricant 416 inside lubricant reservoir 420 and allow the filling of lubricant reservoir 420 with lubricant 416. In various embodiments, lubricant 416 may be gravity fed to socket 408 from lubricant reservoir 420.

In various embodiments, trailer ball and receiver assembly 400 may further include a component 424 located within lubrication channel 410 to automatically feed, or release, lubricant 416 from lubricant reservoir 420 in response to an input. In various embodiments, component 424 may be a pump, a valve, or other mechanism that can open and close in response to the input, or signal. The one or more sensors 422 may include a temperature sensor, a viscosity sensor, and/or a fill sensor, among others. Each sensor 422 may be able to detect frictional heat of trailer ball and receiver assembly 400 and cause component 424 to provide lubricant 416 in response to the detected frictional heat. In various embodiments, sensor 422 may detect one or more other characteristic and may cause component 424 to provide lubricant 416 in response thereto. For instance, sensor 422 may be a motion sensor, timer, accelerometer, vibration sensor, or any other sensor or combination of sensors as desired. In various embodiments, sensor 422 may be disposed within trailer ball 402. In various embodiments, sensor 422 may be disposed within receiver assembly 406. In various embodiments, each sensor 422 may be configured to provide a signal to one or more components 424. The signal may include an open signal and a close signal. In this way, dispensing lubricant 416 may be automated. Each sensor 422 may be set to release or hold lubricant 426 at a set threshold temperature and/or threshold viscosity or other characteristic or combination of characteristics. That is, when the threshold temperature and/or threshold viscosity are met, then component 424 may release lubricant 416 to be introduced to socket 408. Alternatively, sensor 422 may communicate with one or more computers (that have preprogrammed threshold temperature and/or threshold viscosity) via a network that can further communicate with the one or more components 424 (e.g., pumps and/or release valves, etc.) via a network to release lubricant 416 to socket 408. The system may automatically cease feeding lubricant 416 to socket 408 in response to a preset, or lower threshold, temperature and/or viscosity being detected by sensor 422. This process may be repeated continuously during operation of tow vehicle 102 and trailer 104.

Figure 5C:
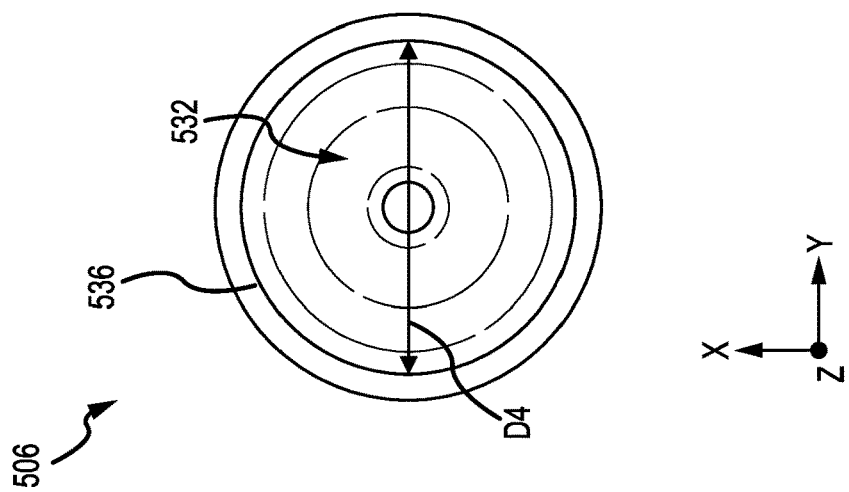
FIGS. 5A, 5B, 5C, 5D, and 5E illustrate aspects of a trailer hitch receiver assembly, in accordance with various embodiments.
Figure 5B:
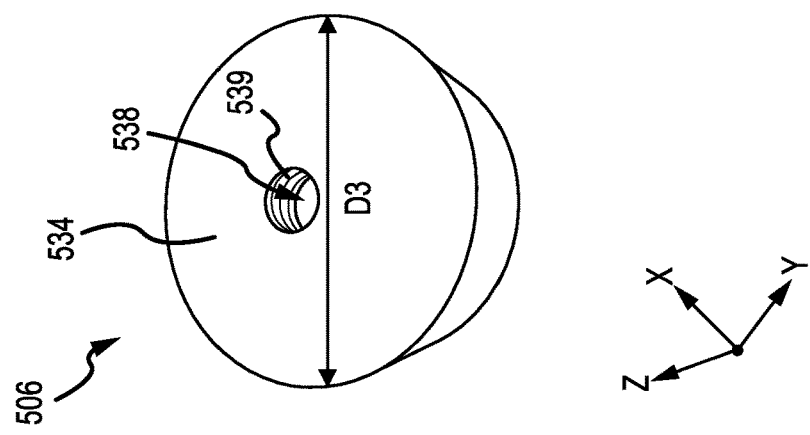
Figure 5A:
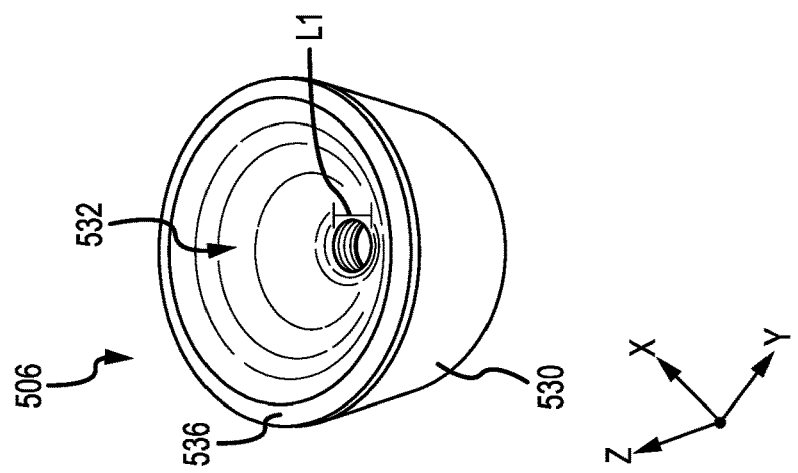
Figure 5E:
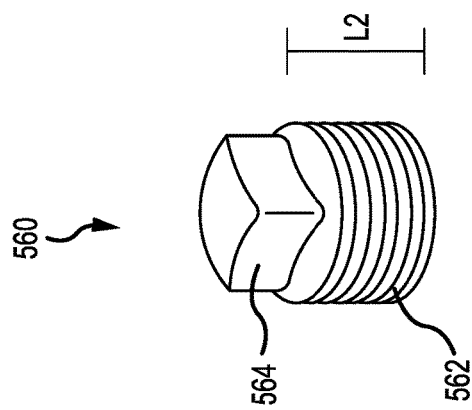
Figure 5D:
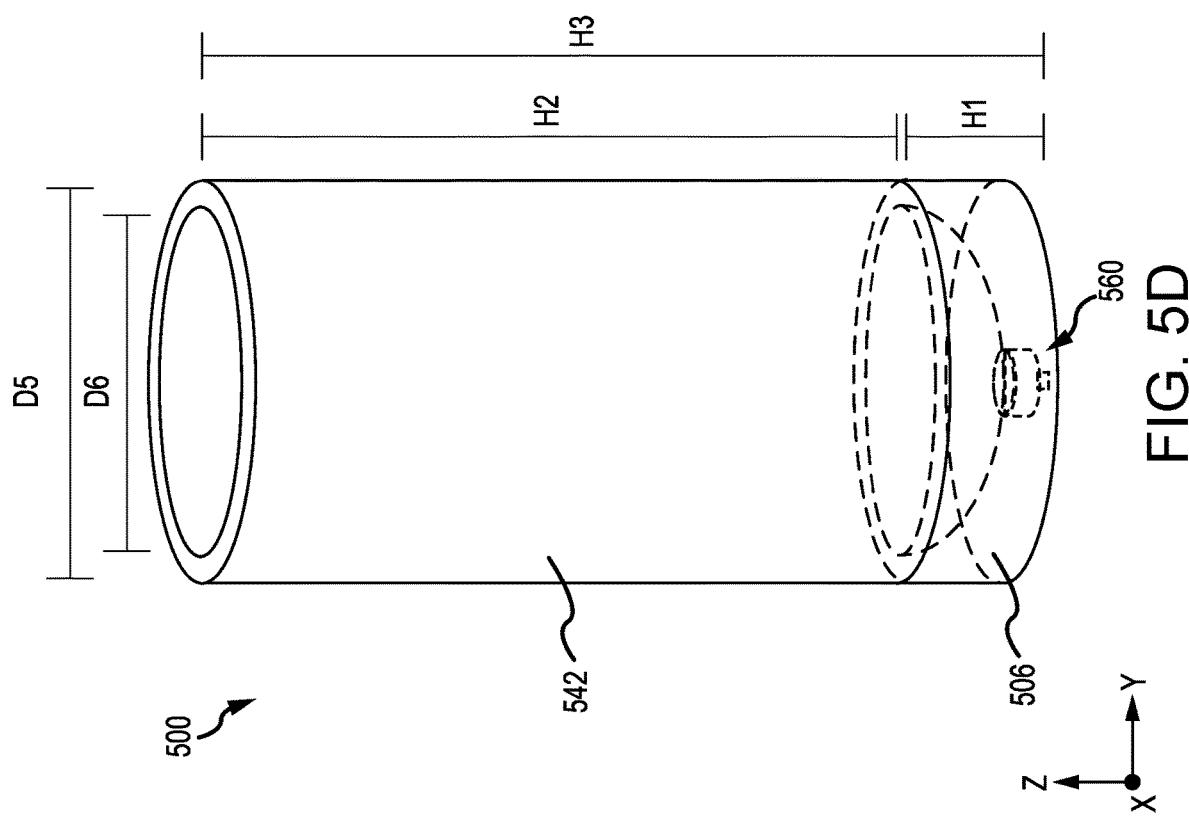

Referring now to FIGS. 5A-5E, a receiver assembly 500 is illustrated, in accordance with various embodiments. In various embodiments, receiver assembly 500 may be an example of receiver assembly 144 described above with respect to FIG. 1. Receiver assembly 500 includes a ball receiver 506, a cylinder 542, and a plug 560. In various embodiments, ball receiver 506 is coupled to cylinder 542 and plug 560 is coupled to ball receiver 506 (such as in FIG. 5D). FIG. 5A illustrates a perspective view from the top of ball receiver 506, FIG. 5B illustrates a perspective view from the bottom of ball receiver 506, FIG. 5C illustrates a top down view of ball receiver 506, FIG. 5D illustrates a side view of receiver assembly 500 showing both ball receiver 506 and cylinder 542 connected together, and FIG. 5E illustrates a side view of plug 560.

Ball receiver 506 includes an outer sidewall 530, a socket 532, a bottom surface 534, a top surface 536, and a lubricant channel 538. Ball receiver 506 may be generally cylindrical in shape with outer sidewall 530 being vertical (e.g., parallel to the z-axis). Outer sidewall 530 extends from top surface 536 to bottom surface 534. Top surface 536 and bottom surface 534 may be parallel to each other. In various embodiments, bottom surface 534 is flat (e.g., parallel to the x-y-plane). Socket 532 is disposed in ball receiver 506 and has a semi-spherical shape that is open upward (e.g., in the positive z-direction). Socket 532 is configured to receive a spherical shaped trailer ball (e.g., trailer ball 140, trailer ball 202, trailer ball 302, etc.) In various embodiments, socket 532 is open toward a bed of the truck (e.g., bed 108 of tow vehicle 102). Ball receiver 506 has an outer diameter D3 that is about 5 inches (about 12.7 centimeters) to about 8 inches (about 20.3 centimeters), and more specifically, about 6.5 inches (about 16.5 centimeters). Socket 532 has a diameter D4 that may be alternatively referred as an inner diameter D4 of ball receiver 506. Diameter D4 is about 5.5 inches (about 14 centimeters) to about 7.5 inches (about 19.1 centimeters), and more specifically, about 6.125 inches (about 15.6 centimeters). Ball receiver 506 has a height H1 that is about 6 inches (about 15.2 centimeters) to about 8 inches (about 20.3 centimeters), and more specifically, about 6.5 inches (about 16.5 centimeters).

Lubricant channel 538 may be located at the bottom of ball receiver 506 (e.g., the negative z-direction) allowing liquid to be drained from ball receiver 506, and more specifically, drained from socket 532. Lubricant channel 538 has a length L1 extending from a bottom of socket 532 (e.g., the negative z-direction) to bottom surface 534 of ball receiver 506 (e.g., the negative z-direction). Length L1 may be about 0.5 inches (about 1.27 centimeters) to about 2 inches (about 5.08 centimeters), and more specifically, about 1 inch (about 2.54 centimeters). Lubricant channel 538 is configured to receive plug 560 to retain liquid (e.g., a lubricant such as described above with respect to FIGS. 3 and 4). In various embodiments, lubricant channel 538 may include threads 539 that are configured to receive and secure plug 560. Plug 560 may include complementary threads 562 configured to engage threads 539 of lubricant channel 538. Plug 560 may further include a head 564 that may be engaged by a tool (e.g., a wrench) to tighten and/or untighten plug 560 from lubricant channel 538. Threads 562 of plug 560 has a length L2 sufficient to engage and seal lubricant channel 538. In various embodiments, length L2 may be about 0.5 inches (about 1.27 centimeters) to about 2 inches (about 5.08 centimeters), and more specifically, about 1 inch (about 2.54 centimeters).

In various embodiments, plug 560 may be press fit into lubricant channel 538. In various embodiments, plug 560 may be a lever-operated plug that is secured in lubricant channel 538 by a lever. In various embodiments, plug 560 may be a twist-lock plug, locking into place in lubricant channel 538 using a twist mechanism.

Referring now to FIG. 5D, ball receiver 506 may be coupled to cylinder 542 prior to, or as part of, installation in a tow vehicle (e.g., tow vehicle 102, FIG. 1), to form receiver assembly 500. In various embodiments, ball receiver 506 and cylinder 542 may be formed as a single monolithic component. Cylinder 542 has an outer diameter D5 and an inner diameter D6. Outer diameter D5 may be about equal to outer diameter D1 of ball receiver 506 and inner diameter D6 may be about equal to inner diameter D2 of ball receiver 506. Cylinder 542 has a height H2 that may be adjusted for proper installation in tow vehicle (e.g., tow vehicle 102, FIG. 1). Height H2 may be about 3 inches (about 7.62 centimeters) to about 36 inches (about 91.4 centimeters), and more specifically, about 6 inches (about 15.2 centimeters) to about 24 inches (about 61 centimeters). In various embodiments, ball receiver 506 may be welded to cylinder 542 with socket 532 opening upward (e.g., the positive z-direction) into cylinder 542. Receiver assembly 500 (e.g., ball receiver 506 and cylinder 542) has a height H3 that is about 9 inches (about 22.9 centimeters) to about 42 inches (about 107 centimeters), and more specifically, about 12 inches (about 30.5 centimeters) to about 30.5 inches (about 77.5 centimeters). In various embodiments, receiver assembly 500 may be cut to a height shorter than height H3 prior to installation in the tow vehicle. In various embodiments, cylinder 542 may be cut to a shorter height than height H2 prior to coupling cylinder 542 to ball receiver 506.

Ball receiver 506, and more specifically, socket 532 is configured to receive a lubricant such as grease, oil, or other lubricants. In various embodiments, the lubricant may be lubricant 416 described above with respect to FIG. 4. The lubricant may be manually added to ball receiver 506 through the top of cylinder 542 (e.g., the positive z-direction). The lubricant is held in socket 532 by plug 560. Plug 560 may be removed to drain the lubricant through lubricant channel 538.

Figure 6B:
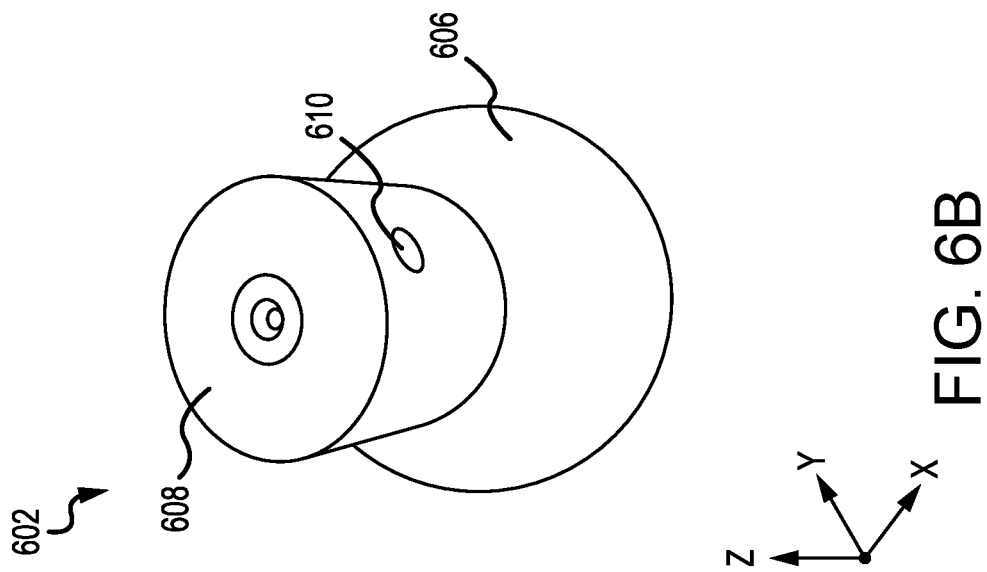
FIGS. 6A, 6B, 6C, and 6D illustrate aspects of a trailer hitch ball assembly, in accordance with various embodiments.
Figure 6A:
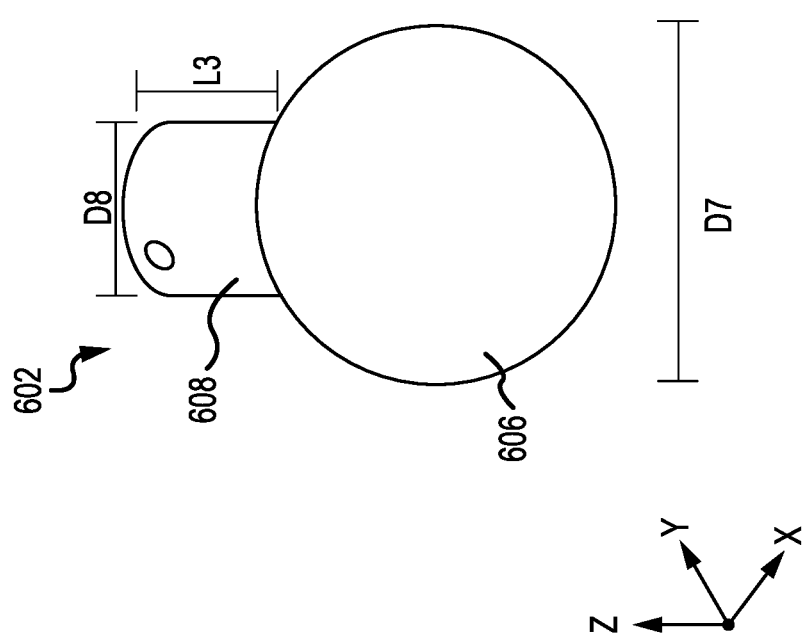
Figure 6D:
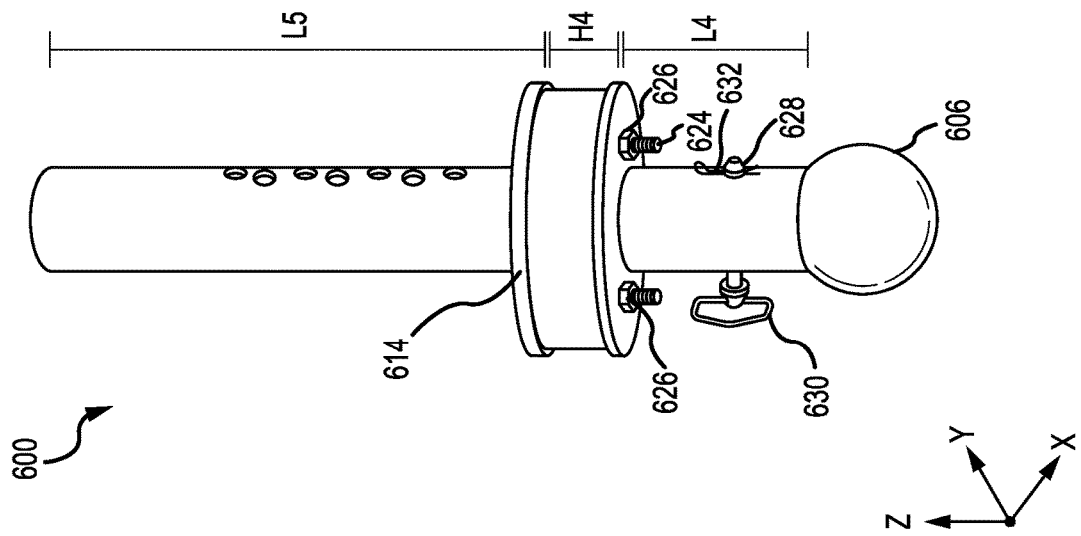
Figure 6C:
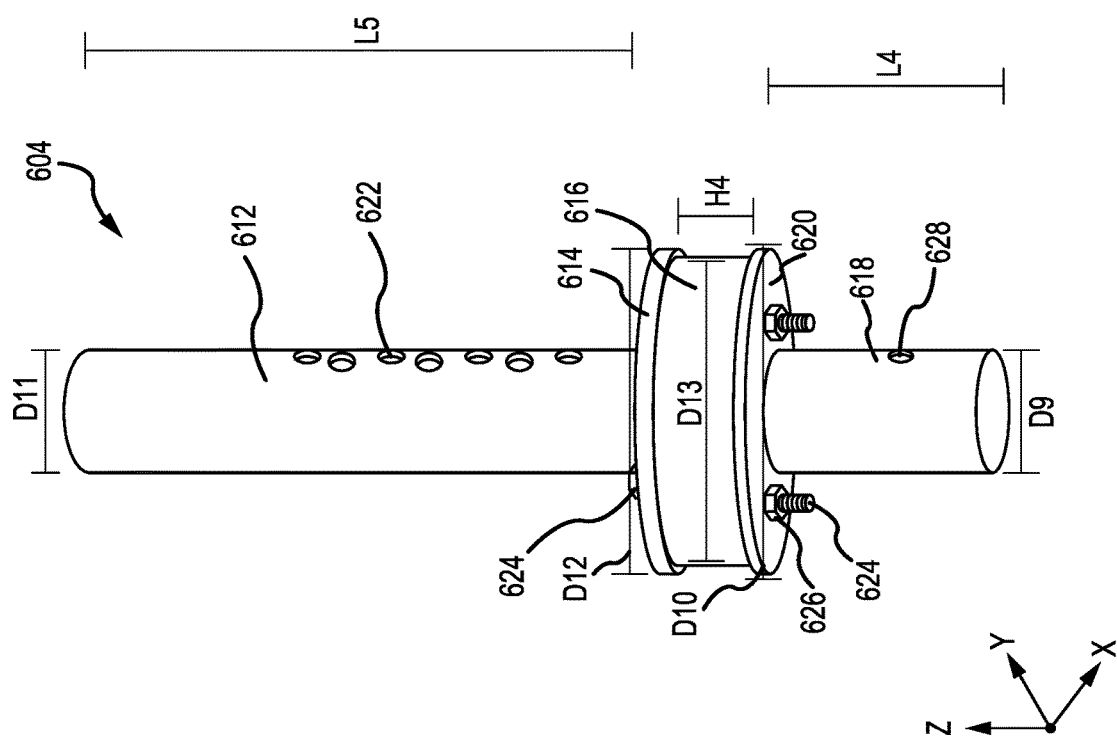

Referring now to FIGS. 6A-6D, a trailer ball assembly 600 and its various components are illustrated, in accordance with various embodiments. Trailer ball assembly 600 includes a trailer ball 602 and a trailer coupler 604. Trailer ball 602 includes a spherical ball portion 606, a ball coupler portion 608, and a securing hole 610 formed through ball coupler portion 608. In various embodiments, ball coupler portion 608 may be cylindrical, rectangular, triangular, or hexagonal, among other shapes. Spherical ball portion 602 is configured to engage socket 538 of receiver assembly 506 as described above in FIGS. 5A-5E. Spherical ball portion 606 has a diameter D7 that is about 5 inches (about 12.7 centimeters) to about 7 inches (about 17.8 centimeters), and more specifically, about 6 inches (about 15.2 centimeters). In various embodiments, diameter D7 may be 8 inches or greater depending on design use, load requirements, trailer rotation forces (e.g., side winds, grade angles, shifting loads, etc. or a combination thereof). Diameter D7 may be about 1/16 inches (about 0.159 centimeter) to about 5/16 inches (about 0.794 centimeter) smaller than diameter D3, and more specifically, about 2/16 inches (about 0.318 centimeter) to about 3/16 inches (about 0.476 centimeter) smaller than diameter D3. FIGS. 6A and 6B illustrate perspective views of trailer ball 602, FIG. 6C illustrates trailer coupler 604, and FIG. 6D illustrates trailer ball assembly 600.

Ball coupler portion 608 is coupled to the top (e.g., the positive z-direction) of the spherical ball portion 606. Ball coupler portion 608 has a diameter D8 and a length L3. Diameter D8 is about 2 inches (about 5.08 centimeters) to about 6 inches (about 15.2 centimeters), and more specifically, about 3 inches (about 7.62 centimeters) to about 4 inches (about 10.2 centimeters). Length L3 is about 2 inches (about 5.08 centimeters) to about 5 inches (about 12.7 centimeters), and more specifically, about 3 inches (about 7.62 centimeters) to about 4 inches (about 10.2 centimeters). Securing hole 610 is formed near the top (e.g., the positive z-direction) of ball coupler portion 608 and extends through ball coupler portion 608.

Trailer coupler 604 includes a trailer coupler adapter 612, a trailer adapter plate 614, a damper 616, a ball mount 618, and a ball mount plate 620. Trailer coupler 604 is configured to interface with a trailer (e.g., trailer 104), and more specifically, with a coupler hitch (e.g., coupler hitch 120). In various embodiments, the trailer may be a gooseneck trailer. Trailer coupler 604 may replace the existing coupler hitch allowing any trailer to be converted to use the trailer ball and receiver assembly (e.g., trailer ball and receiver system 112, FIG. 1) disclosed herein with minimal changes to the trailer.

Ball mount 618 is configured to receive and secure trailer ball 602. Ball mount 618 has a diameter D9 and a length L4. Diameter D9 is about 3 inches (about 7.62 centimeters) to about 7 inches (about 17.8 centimeters), and more specifically, about 4 inches (about 10.2 centimeters) to about 5 inches (about 12.7 centimeters). Length L4 is about 6 inches (about 15.2 centimeters) to about 24 inches (about 61 centimeters), and more specifically, about 9 inches (about 22.9 centimeters) to about 18 inches (about 45.7 centimeters). Ball mount 618 includes a pair of holes 628 configured to align with securing hole 610 of trailer ball 602. Ball mount 618 further includes a pair of holes 628 formed therethrough that may be used to engage and secure trailer ball 602.

Ball mount plate 620 is coupled to a top portion of ball mount 618 (e.g., the positive z-direction). In various embodiments, ball mount plate 620 is welded to ball mount 618. Ball mount plate 620 has a diameter D10 that is about 5 inches (about 12.7 centimeters) to about 8 inches (about 20.3 centimeters), and more specifically, about 5.5 inches (about 14 centimeters) to about 6.5 inches (about 16.5 centimeters). In various embodiments, ball mount plate 620 is sized to fit inside receiver assembly 500, and more specifically, inside cylinder 542.

Trailer coupler adapter 612 has a diameter D11 and a length L5. Diameter D11 is about 3 inches (about 7.62 centimeters) to about 7 inches (about 17.8 centimeters), and mores specifically, about 4 inches (about 10.2 centimeters) to about 5 inches (about 12.7 centimeters). Length L5 is about 6 inches (about 15.2 centimeters) to about 48 inches (about 122 centimeters), and mores specifically, about 18 inches (about 45.7 centimeters) to about 36 inches (about 91.4 centimeters). Trailer coupler adapter 612 includes a plurality of holes 622 for along length L5. The plurality of holes 622 are configured to secure trailer ball assembly 600, and more specifically, trailer coupler adapter 612 to the trailer (e.g., trailer 104, FIG. 1). In various embodiments, the plurality of holes 622 are arranged in a straight line along length L5. In various embodiments, such as the illustrated embodiment, the plurality of holes 622 are aligned so that alternating holes are laterally offset from the vertically adjacent holes.

Trailer adapter plate 614 is coupled to a bottom portion of trailer coupler adapter 612 (e.g., the negative z-direction). In various embodiments, trailer adapter plate 614 is welded to trailer coupler adapter 612. Trailer adapter plate 614 has a diameter D12 that is about 5 inches (about 12.7 centimeters) to about 8 inches (about 20.3 centimeters), and more specifically, about 5.5 inches (about 14 centimeters) to about 6.5 inches (about 16.5 centimeters). In various embodiments, trailer adapter plate 614 is sized to fit inside receiver assembly 500 (FIG. 5D), and more specifically, inside cylinder 542 (FIG. 5D).

Damper 616 is disposed between, and coupled to, trailer adapter plate 614 and ball mount plate 620 when trailer ball assembly 600 is assembled. Damper 616 has a diameter D13 and a height H4. Diameter D13 is about 5 inches (about 12.7 centimeters) to about 8 inches (about 20.3 centimeters), and mores specifically, about 5.5 inches (about 14 centimeters) to about 6.5 inches (about 16.5 centimeters). Height H4 is about 2 inches (about 5.08 centimeters) to about 6 inches (about 15.2 centimeters), and mores specifically, about 3 inches (about 7.62 centimeters) to about 4 inches (about 10.2 centimeters). Trailer adapter plate 614, damper 616, and ball mount plate 620 may be coupled together using a plurality of bolts 624, nuts 626, and, in various embodiments, washers. Damper 616 may include a plurality of holes through which bolts 624 may extend.

Trailer ball assembly 600 further includes a pin 630 and cotter pin 632 that may be used to secure trailer ball 602 to ball mount 618. Trailer ball 602, and more specifically, ball coupler portion 608 is inserted into ball mount 618. Securing hole 610 and holes 628 are then aligned so that pin 630 may pass through securing hole 610 and holes 628, thereby supporting trailer ball 602. Pin 630 may include a handle, or other protrusion, at a proximal end of pin 630 to prevent pin 630 from passing entirely through securing hole 610 and holes 628. Cotter pin 632 is inserted through a distal end of pin 630, preventing pin 630 from being pulled back out of securing hole 610 and holes 628.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A towing system, comprising:
    a tow vehicle having a bed;
    a trailer; and
    a lubricated ball and receiver assembly coupling the trailer to the tow vehicle, the lubricated ball and receiver assembly including:
        a receiver assembly having a first end and a second end, the first end coupled to the bed of the tow vehicle, the second end extending downward from the bed of the tow vehicle, the second end of the receiver assembly ending in a semi-spherical ball receiver;
        a lubricant channel formed in the semi-spherical ball receiver and through the second end of the receiver assembly;
        a lubricant disposed in the semi-spherical ball receiver;
        a trailer ball sized to pass through the receiver assembly and into the semi-spherical ball receiver; and
        a trailer coupler including a trailer coupler adapter having a first end and a second end, the first end of the trailer coupler adapter coupled to the trailer, and the second end of the trailer coupler adapter coupled to the trailer ball.

2. The towing system of claim 1, further comprising:
    a plug configured to be inserted into the lubricant channel, the plug preventing the lubricant from exiting the receiver assembly when inserted.

3. The towing system of claim 1, wherein the trailer ball has a first diameter and the semi-spherical ball receiver has a second diameter, the second diameter being larger than the first diameter.

4. The towing system of claim 3, wherein the first diameter is about 5 inches to about 7 inches and the second diameter is about 1/16 inches to about 3/16 inches larger than the first diameter.

5. The towing system of claim 1, the trailer coupler further comprising:
    a ball mount having a first end and a second end; and
    a damper disposed between the trailer coupler adapter and the ball mount.

6. The towing system of claim 1, wherein the receiver assembly extends about 3 inches to about 18 inches below the bed of the tow vehicle.

7. A towing system, comprising:
    a tow vehicle including a bed;
    a trailer;
    a trailer ball assembly coupled to the trailer;
    a ball receiver assembly coupled to the bed of the tow vehicle and extending below the bed of the tow vehicle, and configured to receive the trailer ball assembly, the ball receiver assembly including a semi-spherical socket; and
    a lubricant disposed within the semi-spherical socket of the ball receiver assembly.

8. The towing system of claim 7, wherein the ball receiver assembly further comprises:
    a channel formed in and through a bottom of the ball receiver assembly, the channel configured to drain the lubricant from the ball receiver assembly; and
    a removable plug configured to be inserted into the channel, the removable plug preventing the lubricant from draining from the ball receiver assembly.

9. The system of claim 7, wherein the trailer ball assembly further includes a trailer ball, the trailer ball having a first diameter.

10. The system of claim 9, wherein the first diameter is about 5 inches to about 7 inches.

11. The system of claim 9, wherein the semi-spherical socket of the ball receiver assembly has a second diameter that is greater than the first diameter.

12. The system of claim 11, wherein the second diameter is about 1/16 inch larger than the first diameter.

13. A trailer ball and receiver assembly, comprising:
    a trailer ball assembly coupled to a trailer, the trailer ball assembly including a trailer ball;
    a ball receiver assembly coupled to a bed of a tow vehicle and extending the bed of the tow vehicle, the ball receiver assembly including a semi-spherical socket configured to receive the trailer ball assembly, an inlet, and a lubricant channel extending from the inlet to the semi-spherical socket; and
    a lubricant disposed within the semi-spherical socket and between the semi-spherical socket and the trailer ball.

14. The trailer ball and receiver assembly of claim 13, wherein the lubricant channel is formed in a bottom of the semi-spherical socket and extends through a bottom of the ball receiver assembly to the inlet; wherein the receiver assembly further comprises:
    a plug configured to be inserted into and removed from the lubricant channel, the plug further configured to prevent liquid from passing through the lubricant channel when inserted into the lubricant channel.

15. The trailer ball and receiver assembly of claim 13, the receiver assembly further comprising:
    a cylinder having a first end and opposing second; and a hole formed from the first end to the second end, wherein the second end of the cylinder is coupled to the ball receiver assembly so that the semi-spherical socket opens toward the hole.

16. The trailer ball and receiver assembly of claim 13, wherein the semi-spherical socket has a diameter of about 5.5 inches to about 7.5 inches.

17. The trailer ball and receiver assembly of claim 13, wherein the trailer ball has a diameter of about 5 inches to about 7 inches.

18. The trailer ball and receiver assembly of claim 13, further comprising:
   a ball mount configured to receive the trailer ball and secure the trailer ball in place; and
   a trailer coupler adapter having a first end and a second end, the first end coupled to the ball mount and the second end coupled to the trailer.

* * * * *